(12) United States Patent
Watanabe (10) Patent No.: US 11,087,625 B2
(45) Date of Patent: Aug. 10, 2021

(54) ABNORMALITY NOTIFICATION DEVICE

(71) Applicant: DENSO CORPORATION, Kariya (JP)

(72) Inventor: Fumio Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/736,843

(22) Filed: Jan. 8, 2020

(65) Prior Publication Data

US 2020/0226929 A1    Jul. 16, 2020

(30) Foreign Application Priority Data

Jan. 10, 2019   (JP) .............................. JP2019-002716

(51) Int. Cl.
   *G08G 1/16*     (2006.01)
   *H04W 4/46*     (2018.01)
   *H04W 4/02*     (2018.01)
   *H04W 28/02*    (2009.01)

(52) U.S. Cl.
   CPC ............ *G08G 1/163* (2013.01); *H04W 4/023* (2013.01); *H04W 4/46* (2018.02); *H04W 28/0215* (2013.01)

(58) Field of Classification Search
   CPC ........ G08G 1/163; H04W 4/46; H04W 4/023; H04W 28/0215
   See application file for complete search history.

(56) References Cited

U.S. PATENT DOCUMENTS

| 2002/0044049 A1* | 4/2002 | Saito ...................... G07C 5/008 340/438 |
| --- | --- | --- |
| 2004/0085198 A1 | 5/2004 | Saito et al. |
| 2006/0020380 A1 | 1/2006 | Saito et al. |
| 2012/0158276 A1* | 6/2012 | Kim ................. G08G 1/096775 701/119 |
| 2016/0119151 A1* | 4/2016 | Park ...................... H04L 9/3268 713/158 |
| 2017/0289098 A1* | 10/2017 | Chun .................... H04L 61/103 |
| 2018/0040246 A1* | 2/2018 | Yonemura .............. G08G 1/161 |
| 2019/0135231 A1* | 5/2019 | Sakuma .................. B60R 25/33 |
| 2019/0344669 A1* | 11/2019 | Makanawala ......... H02J 7/0029 |
| 2020/0108835 A1* | 4/2020 | Suzuki ................. G07C 5/0866 |

FOREIGN PATENT DOCUMENTS

JP            3834463 B2    10/2006

* cited by examiner

*Primary Examiner* — Thomas D Alunkal
(74) *Attorney, Agent, or Firm* — Harness, Dickey & Pierce, P.L.C.

(57) ABSTRACT

An abnormality notification device in a vehicle determines contents of situation information received from a second vehicle as abnormal at a certain timing. Then, the vehicle transmits abnormality information including identity information of the second vehicle to a station at a next timing, and transmits at a yet next timing a report completion notice notifying a nearby vehicle of the identity information of the second vehicle regarding which the abnormality information has already been transmitted to the station. When the nearby vehicle detects the second vehicle at still yet next timing as an abnormal vehicle, the nearby vehicle refrains from transmitting the abnormality information of the second vehicle at a subsequent timing, since the nearby vehicle has already received the report completion notice from the vehicle at the yet next timing. As such, unnecessary communication between a vehicle and a station is suppressed, and frequency utilization efficiency is improvable.

6 Claims, 5 Drawing Sheets

ABNORMALITY NOTIFICATION DEVICE

CROSS REFERENCE TO RELATED APPLICATION

The present application is based on and claims the benefit of priority of Japanese Patent Application No. 2019-002716, filed on Jan. 10, 2019, the disclosure of which is incorporated herein by reference.

TECHNICAL FIELD

The present disclosure generally relates to an abnormality notification device.

BACKGROUND INFORMATION

The related art includes a V2X system comprising a plurality of vehicles to perform inter-vehicle communications and road-to-vehicle communications. V2X is an abbreviation of "Vehicle to X." In the V2X system, when each vehicle in the system shares situation information, which is information representing a travel situation such as position information, and a collision or the like is predicted as a result of (i) prediction of the courses of a subject vehicle and other vehicles and (ii) comparison thereof, such a prediction is notified to the driver of the subject vehicle, for example.

In the V2X system, since each vehicle predicts a collision or the like based on the situation information received from other vehicle(s), when there is a vehicle transmitting abnormal situation information, there may be a possibility that appropriate prediction cannot be performable.

Therefore, a vehicle finding an abnormal vehicle may be configured to transmit information on such an abnormal vehicle to a station and to upload the information to a server.

However, when a large number of vehicles detect the same abnormal vehicle and all of those vehicles detecting the abnormal vehicle transmit the information of the abnormal vehicle to the station, communication between the station and the vehicles is congested by the transmission of information of the same abnormal vehicle, thereby deteriorates frequency utilization efficiency.

SUMMARY

It is an object of the present disclosure to provide a technique for suppressing unnecessary communication between a vehicle and a station, and improving frequency utilization efficiency.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, an exemplary embodiment of the present disclosure is described with reference to the drawings.

1. Configuration

Figure 1:
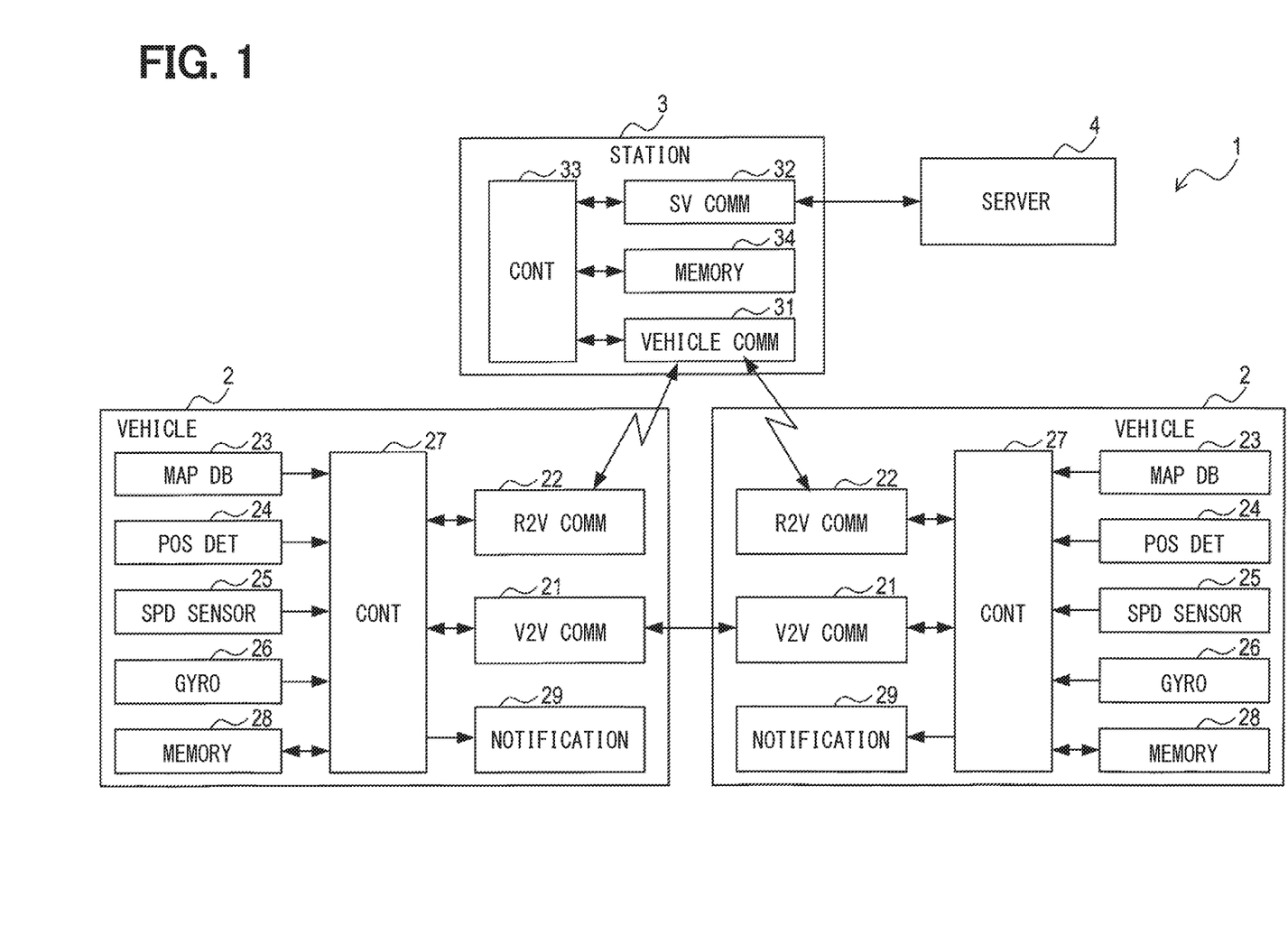
FIG. 1 is a block diagram of a system configuration of an abnormal vehicle reporting system.

As shown in FIG. 1, the abnormal vehicle reporting system 1 includes a plurality of vehicles 2, a station 3, and a server 4.

The vehicle 2 includes an inter-vehicle (V2V) communication device 21, a road-to-vehicle (R2V) communication device 22, a map database 23, a position detection device 24, a vehicle speed sensor 25, a gyro sensor 26, a control device 27, a memory 28, and a notification device 29.

The inter-vehicle communication device 21 is a communication device for performing wireless communication with another vehicle 2 other than the subject vehicle. Through inter-vehicle communication, each vehicle 2 transmits situation information, which is information indicating a travel situation of the vehicle such as a current position, a travel speed, a travel direction, etc., to other vehicle(s), and receives the situation information of the other vehicle(s).

The road-to-vehicle communication device 22 is a communication device for performing wireless communication with the station 3. The map database 23 stores map data. The position detection device 24 detects the current position of the subject vehicle, specifically, an absolute position represented by latitude and longitude, based on a GPS signal or the like received via a GPS antenna (not shown).

The vehicle speed sensor 25 is a sensor that detects a travel speed of the subject vehicle. The gyro sensor 26 is a sensor that detects a travel direction of the subject vehicle, and outputs a detection signal according to an angular velocity of a rotational motion applied to the subject vehicle.

The control device 27 is implemented as, for example, a known microcomputer having a CPU, a ROM, a RAM and the like (respectively not shown). The CPU executes a program stored in the ROM, which is a non-transitory, tangible recording medium. By executing the program, a method corresponding to the program is executed. The control device 27 may include one microcomputer or may include a plurality of microcomputers. Further, the method for realizing functions of the control device 27 is not limited to implementation by software, and some or all of the functions may be realized using one or more hardware devices. For example, when a function of the control device 27 is realized by an electronic circuit, which is a hardware device, such an electronic circuit may be provided as a digital circuit, or an analog circuit, or a combination thereof, i.e., a digital-analog hybrid circuit.

The control device 27 is configured to calculate a possibility of a collision between the subject vehicle and the other vehicle based on the situation information of the subject vehicle and the situation information received from the other vehicle. If a collision of the vehicles is foreseen from the calculation of the collision possibility, the control device 27 instructs the notification device 29 to give notice to the driver to avoid the collision. This makes it possible to predict a collision with the other vehicle that cannot be directly seen from the subject vehicle, thereby enabling avoidance of collision in a location of poor visibility (e.g., a blind corner or the like).

The memory 28 is a storage medium for storing various information. The notification device 29, upon receiving an instruction from the control device 27, notifies the driver via display or by sound. Further, the control device 27 executes an abnormality notification process shown in FIG. 4 described later according to the program described above.

The station 3 includes a vehicle communication unit 31, a server communication unit 32, a control unit 33, and a memory 34. The vehicle communication unit 31 is a communication device for performing wireless communication with the vehicle 2. The server communication unit 32 is a communication device for performing wired communication with the server 4.

The control unit 33 is implemented as, for example, a known microcomputer having a CPU, a ROM, a RAM and the like (respectively not shown). The CPU executes a program stored in the ROM, which is a non-transitory, tangible recording medium. By executing the program, a method corresponding to the program is performed. Specifically, the control unit 33 performs a server notification process shown in FIG. 5 described later according to the program. The control unit 33 may include one microcomputer or a plurality of microcomputers. Further, the method for realizing the function of the control unit 33 is not limited to implementation by software, and some or all of the functions may be realized using one or more hardware devices. For example, when a function of the control unit 33 is realized by an electronic circuit, which is a hardware device, such an electronic circuit may be provided as a digital circuit, or an analog circuit, or a combination thereof, i.e., a digital-analog hybrid circuit. By the program, a method corresponding to the program is performed.

2. Process Overview

Figure 2:
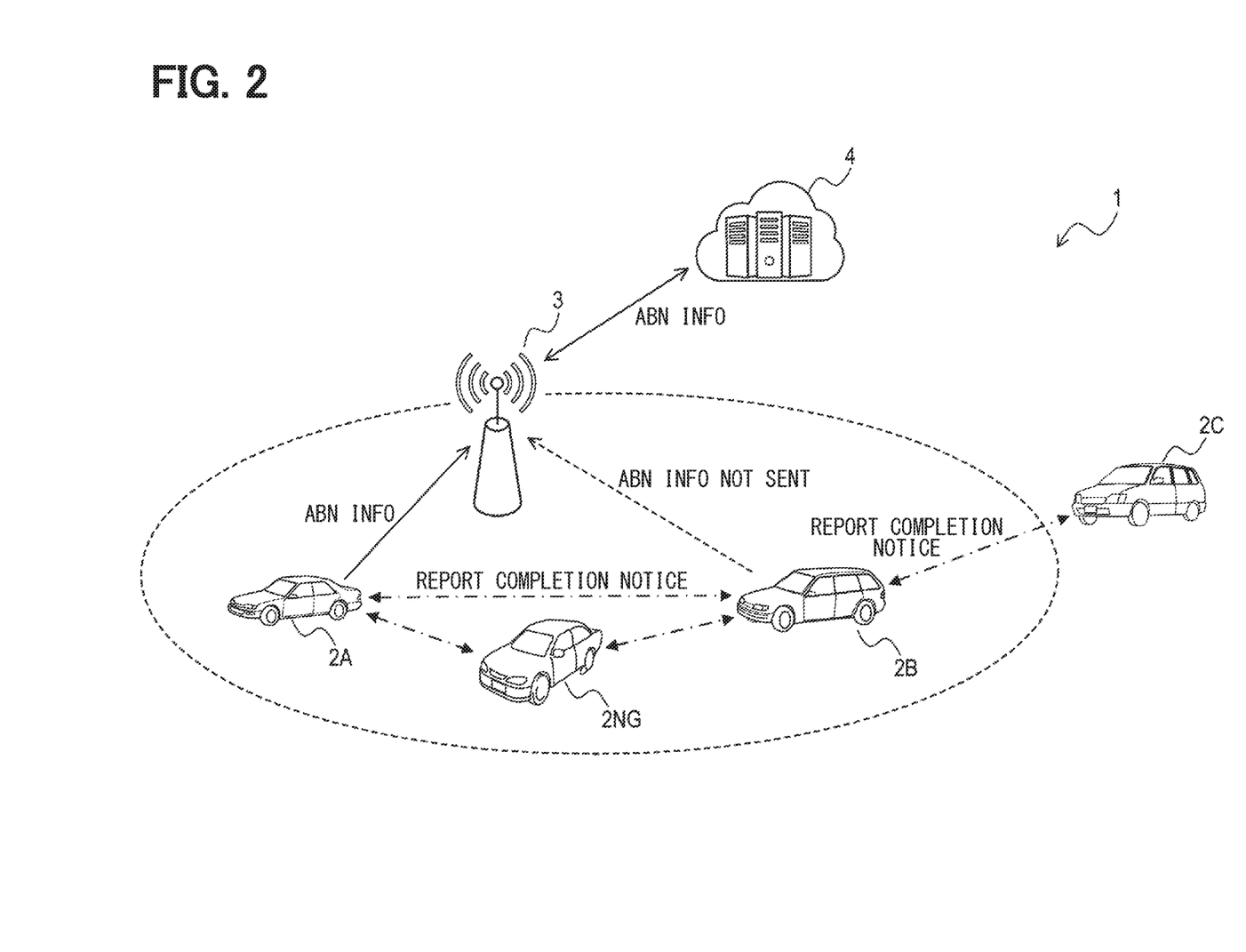
FIG. 2 is an illustration of configuration of the abnormal vehicle reporting system.
Figure 3:
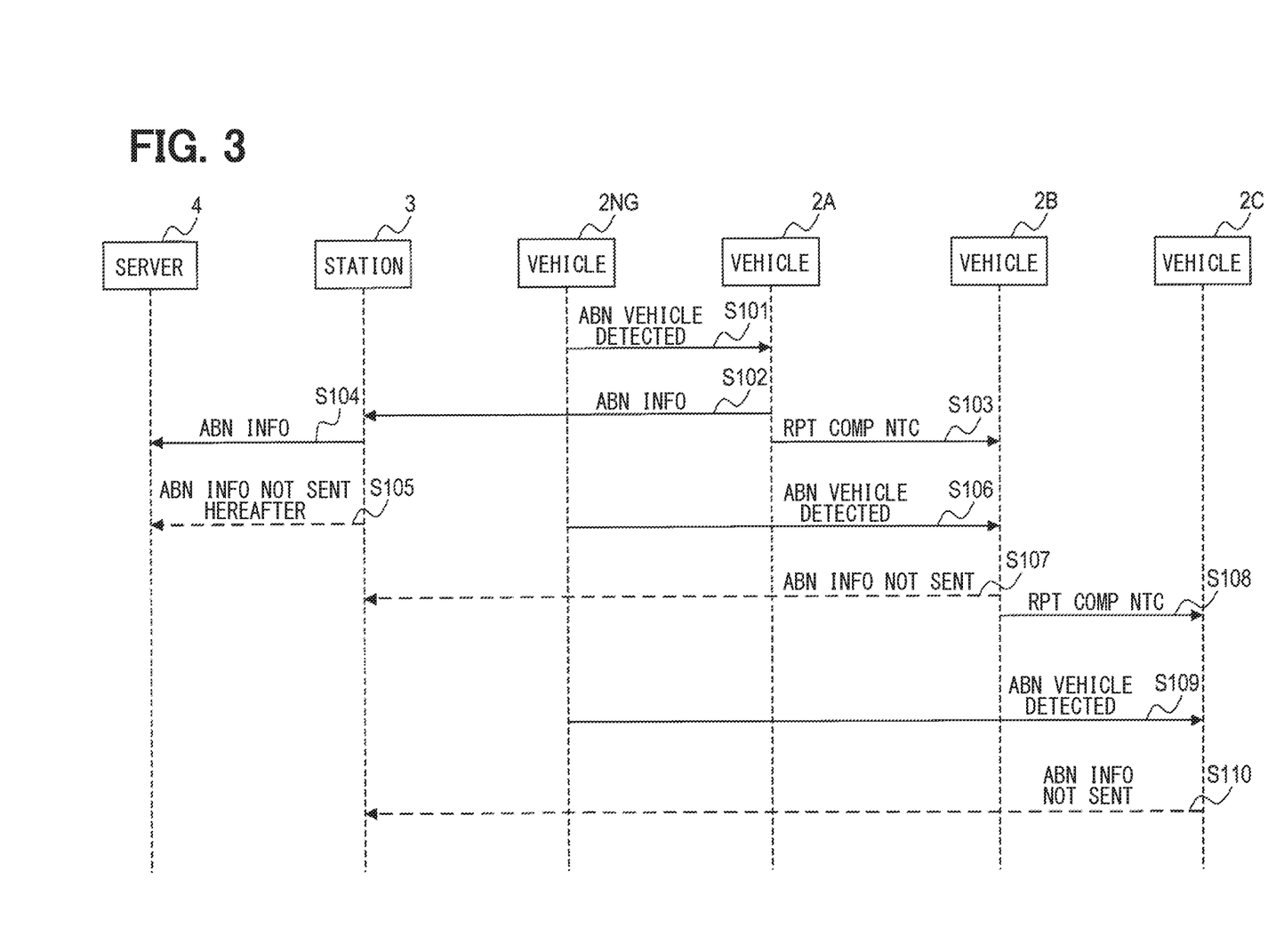
FIG. 3 is a timing chart of a process of the abnormal vehicle reporting system.

Next, the outline of the process performed in the abnormal vehicle reporting system 1 is described using a diagram of FIG. 2 and a timing chart of FIG. 3.

The vehicles 2A to 2C and a vehicle 2NG in FIG. 2 and FIG. 3 are the vehicles 2 constituting the abnormal vehicle reporting system 1, respectively. As shown in FIG. 2, the vehicle 2A, the vehicle 2B, and the vehicle 2NG are located in a communication area of the station 3 and in a communicable distance of the inter-vehicle communication with each other. Vehicles 2B and 2NG are thereby known as other surrounding or nearby vehicles with respect to vehicle 2A. On the other hand, the vehicle 2C is located outside the communication area of the station 3, and can communicate with the vehicle 2B, but cannot communicate with the vehicle 2A and the vehicle 2NG.

The vehicle 2A, the vehicle 2B, and the vehicle 2NG respectively receive (i.e., exchange, in other words) the situation information by inter-vehicle communication. Here, it is assumed that the vehicle 2A has received the situation information from the vehicle 2NG earlier than the vehicle 2B.

As shown in FIG. 3, when the vehicle 2A receives the situation information from the vehicle 2NG, the vehicle 2A determines that contents of the situation information are abnormal in S101, and detects the vehicle 2NG as an abnormal vehicle that transmits abnormal situation information.

In S102, the vehicle 2A transmits, to the station 3, abnormality information including identification information of the vehicle 2NG detected as an abnormal vehicle. Subsequently, in S103, the vehicle 2A broadcasts, to the other vehicle(s) 2, a report completion notice notifying the identification information of the vehicle 2NG regarding which the abnormality information has already been transmitted to the station 3. The vehicle 26 which is within a communicable distance of the inter-vehicle communication with the vehicle 2A receives the report completion notice.

The station 3 having received the abnormality information from the vehicle 2A transmits the abnormality information to the server 4 in S104. As shown in S105, the station 3 does not transmit, for a certain period of time after reception of the abnormality information from the vehicle 2A, the abnormality information to the server 4 even if the abnormality information about the vehicle 2NG is received again.

When the vehicle 2B receives the situation information from the vehicle 2NG in S106, the vehicle 26 determines that contents of the situation information are abnormal, and detects the vehicle 2NG as an abnormal vehicle. When an abnormal vehicle is detected, the vehicle 2 transmits the abnormality information to the station 3 in principle. However, in the present situation, since the vehicle 2B has already received the report completion notice about the vehicle 2NG, the vehicle 2B does not transmit, as shown in S107, the abnormality information on the vehicle 2NG to the station 3.

In S108, the vehicle 2B broadcasts the report completion notice received from the vehicle 2A to the other vehicle 2, i.e., to the vehicle 2C in this case. The timing of transmission of the abnormality information is not limited to a timing after the detection of the vehicle 2NG by the vehicle 2B as an abnormal vehicle in S106, but may also be a timing immediately after the reception of the report completion notice by the vehicle 2B from the vehicle 2A. The vehicle 2C, which is at a communicable distance of inter-vehicle communication from the vehicle 2B, receives the report completion notice.

Thereafter, when the vehicle 2C travels to a position at a communicable distance at which inter-vehicle communication is performable with the vehicle 2NG, the vehicle 2C that has already received the situation information from the vehicle 2NG determines in S109 that contents of the situation information are abnormal, and detects the vehicle 2NG as an abnormal vehicle.

Since the vehicle 2C has already received the report completion notice about the vehicle 2NG, the vehicle 2C does not transmit the abnormality information about the vehicle 2NG to the station 3 as shown in S110. Although not shown in the drawing, the vehicle 2C broadcasts the report completion notice received from the vehicle 2B to the other vehicle(s) 2. Further, the report completion notice is transmitted from vehicle to vehicle in a chained manner and spreads, i.e., the vehicle 2 having received the report completion notice from the vehicle 2C transmits the report completion notice to the other vehicle 2 by broadcasts. However, the process of transmitting the received report completion notice to the other vehicle 2 by broadcasts will not be performed when a predetermined condition for limiting the number of times of the process is satisfied. The predetermined condition is, for example, a condition that (i) an elapsed time from the first transmission of the received report completion notice is equal to or greater than a predetermined time, or (ii) a distance between the vehicle receiving the notice and the abnormal vehicle is equal to or greater than a predetermined distance. In such manner, although the report completion notice is transmitted in a chained manner from vehicle to vehicle, the transmission in the chained manner is terminated when a predetermined condition is satisfied.

3-2. Processing

Figure 4:
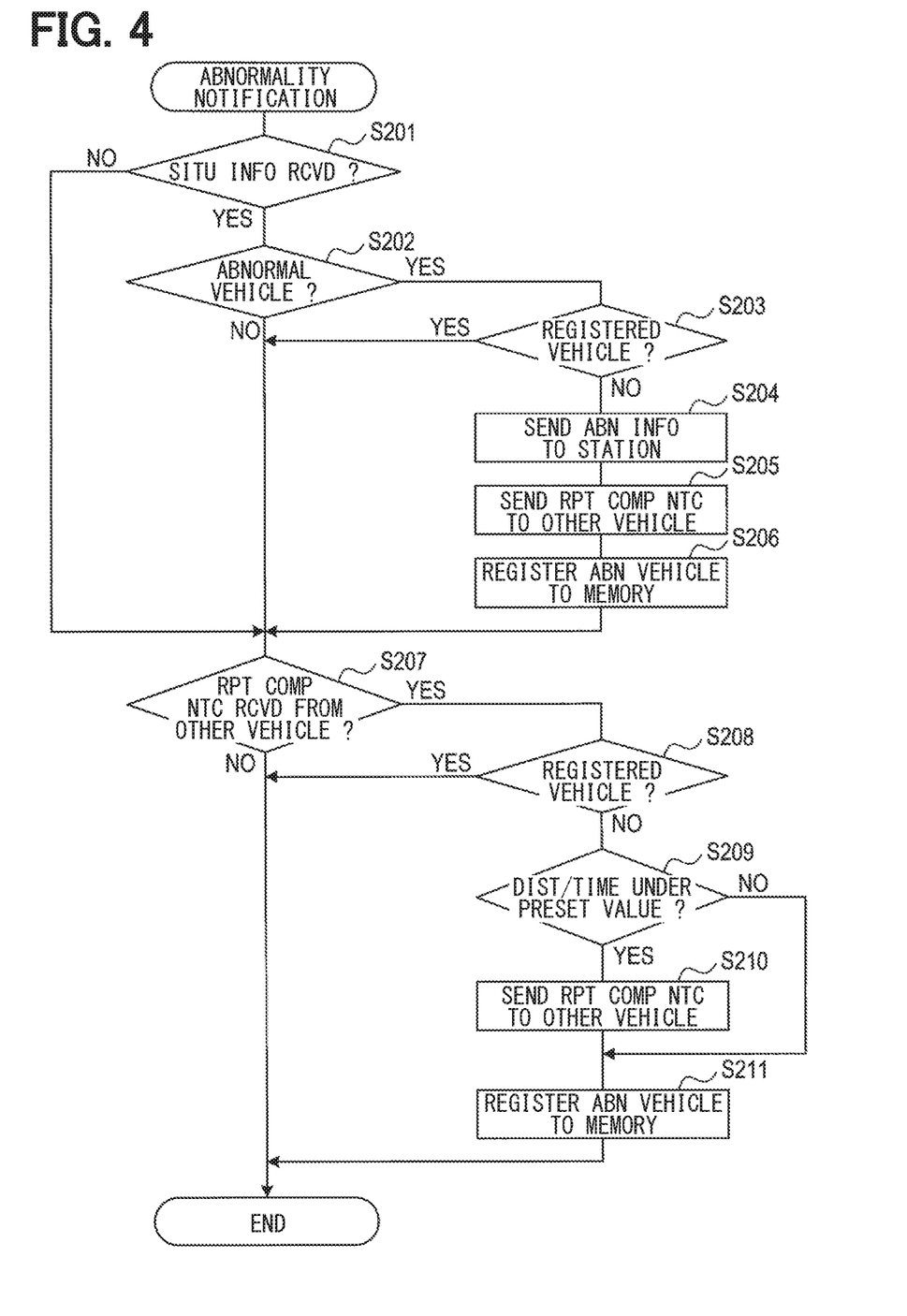
FIG. 4 is a flowchart of an abnormality notification process performed on a vehicle.

Next, the abnormality notification process performed by the control device 27 mounted on a vehicle 2 is described using a flowchart of FIG. 4. The abnormality notification process is periodically performed while the ignition switch of the vehicle 2 is being turned ON.

First, in S201, the control device 27 determines whether or not situation information has been received from the other vehicle 2. If it is determined in S201 that the situation information has not been received from the other vehicle 2, the control device 27 shifts the process to S207.

On the other hand, when the control device 27 determines that situation information is received from the other vehicle 2 in S201, the process proceeds to S202. In S202, the control device 27 determines whether the vehicle 2 that is a transmission source of the situation information is an abnormal vehicle. Specifically, it is determined based on a predetermined standard whether or not contents of the situation information are abnormal, and when the contents of the situation information are abnormal, the vehicle 2 that is the transmission source of the situation information is determined as an abnormal vehicle. For example, when there is a vehicle 2 that transmits "unusual" situation information, the situation information (i.e., the contents thereof) received from the vehicle 2 is determined as abnormal. Specific examples of the situation information determined as abnormal include situation information indicating that the vehicle is traveling at an impossible travel speed, or situation information indicating a current position that cannot be detectable with reference to map data, and the like, or situation information which shows an impossible positional relationship such as one vehicle 2 passing over the other vehicle 2, or the like.

If the control device 27 determines in S202 that the vehicle 2 that is the transmission source of the situation information is not an abnormal vehicle, the control device 27 shifts the process to S207. On the other hand, when the control device 27 determines in S202 that the vehicle 2 that is the transmission source of the situation information is an abnormal vehicle, the control device 27 shifts the process to S203.

In S203, the control device 27 determines whether the abnormal vehicle is a registered vehicle. The registered vehicle is a vehicle registered to the memory 28 as an abnormal vehicle of which the abnormality information has already been transmitted to the station 3.

If it is determined in S203 that the abnormal vehicle is a registered vehicle, the control device 27 shifts the process to S207. On the other hand, when it is determined in S203 that the abnormal vehicle is not a registered vehicle, the control device 27 shifts the process to S204.

In S204, the control device 27 transmits the abnormality information on the abnormal vehicle to the station 3. Subsequently, in S205, the control device 27 transmits, to the other vehicle 2, a report completion notice of the abnormal vehicle.

In S206, the control device 27 registers the abnormal vehicle in the memory 28 as an abnormal vehicle of which abnormality information has already been transmitted to the station 3, and then shifts the process to S207. Note that the information registered to the memory 28 is deleted in sequence from the oldest information every time new information is registered, when a free space in the memory 28 runs out.

In S207, the control device 27 determines whether or not the report completion notice is received from the other vehicle 2. When it is determined in S207 that the report completion notice has not been received from the other vehicle 2, the control device 27 ends the abnormality notification process of FIG. 4.

On the other hand, when it is determined in S207 that the report completion notice has been received from the other vehicle 2, the control device 27 shifts the process to S208. In S208, the control device 27 determines whether the abnormal vehicle notified by the report completion notice is a registered vehicle.

The control device 27 ends the abnormality notification process of FIG. 4 when it is determined in S208 that the abnormal vehicle notified by the report completion notice is a registered vehicle. On the other hand, when it is determined in S208 that the abnormal vehicle notified by the report completion notice is not a registered vehicle, the control device 27 shifts the process to S209.

In S209, the control device 27 determines whether a distance between the vehicle 2 and the abnormal vehicle is less than a predetermined distance and an elapsed time from the first transmission of the report completion notice is less than a predetermined period of time. In the present embodiment, a distance equal to or greater than a predetermined distance or an elapsed time equal to or greater than a predetermined time is set as a predetermined condition that limits the number of transmission processes of the report completion notice.

When it is determined in S209 that the distance is less than a predetermined distance and the elapsed time is less than a predetermined time, the control device 27 shifts the process to S210. After transmitting the report completion notice to the other vehicle 2 in S210, the control device 27 shifts the process to S211.

On the other hand, when it is determined in S209 that the distance is equal to or greater than a predetermined distance or the elapsed time is equal to or greater than a predetermined time or more, the control device 27 shifts the process to S211. In S211, the control device 27 registers the abnormal vehicle notified by the report completion notice to the memory 28 as the abnormal vehicle of which the abnormality information has already been transmitted to the station 3, and then ends the abnormality notification process of FIG. 4.

Figure 5:
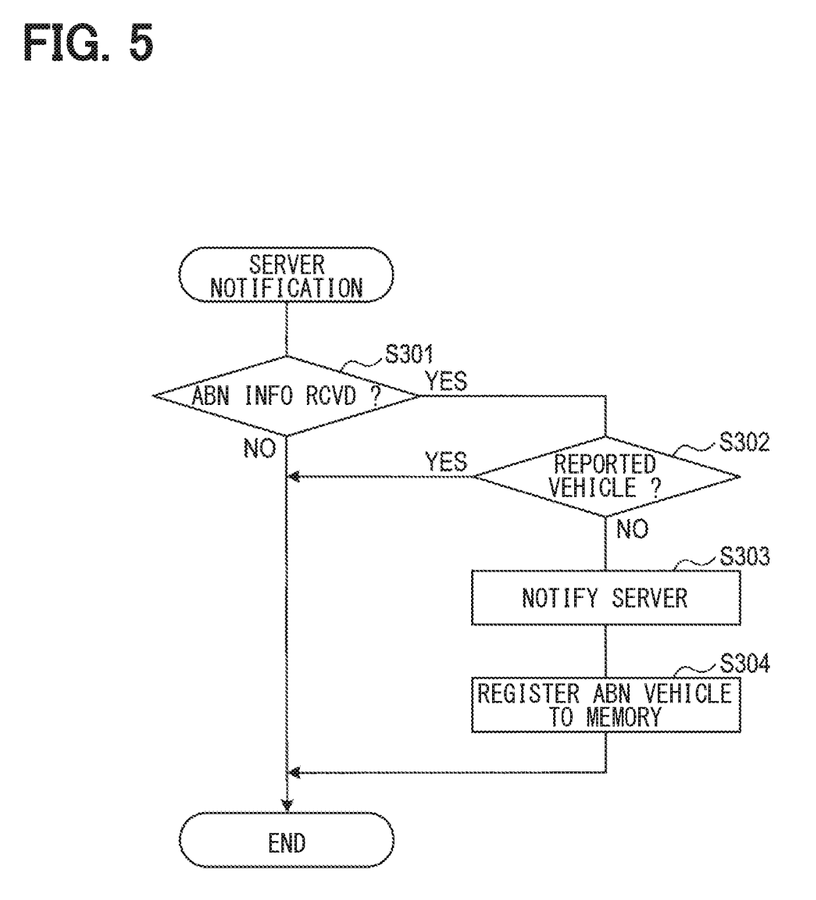
FIG. 5 is a flowchart of a server notification process performed by a station of the abnormal vehicle reporting system.

Next, a server notification process performed by the station 3 is described using a flowchart of FIG. 5. The server notification process is periodically performed. First, in S301, the station 3 determines whether abnormality information has been received from the vehicle 2.

When the station 3 determines in S301 that the abnormality information has not been received from the vehicle 2, the server notification process of FIG. 5 ends. On the other hand, when the station 3 determines that the abnormality information has been received from the vehicle 2 in S301, the process proceeds to S302.

In S302, the station 3 determines whether the abnormal vehicle indicated by the abnormality information is a "reported" vehicle. The reported vehicle is a vehicle already registered to the memory 34 as an abnormal vehicle regarding which the station 3 has already received the abnormality information. The registered information is retained in the memory 34 for a certain period of time and then is erased therefrom.

When the station 3 determines in S302 that the abnormal vehicle indicated by the abnormality information is a reported vehicle, the station 3 ends the server notification process of FIG. 5. On the other hand, when the station 3 determines in S302 that the abnormal vehicle indicated by the abnormality information is not a reported vehicle, the process proceeds to S303.

In S303, the station 3 transmits the abnormality information to the server 4. Subsequently, in S304, the station 3 registers the abnormal vehicle indicated by the abnormality information to the memory 34 as the abnormal vehicle regarding which the abnormality information has already been received, and then ends the server notification process of FIG. 5.

4. Effects

According to the embodiment described above, the following effects can be achievable.

(4a) In the present embodiment, when the vehicle 2 detects an abnormal vehicle, the vehicle 2 transmits the abnormality information about the abnormal vehicle to the station 3 and then transmits a report completion notice to the other vehicle 2. Further, even when the vehicle 2 detects an abnormal vehicle, if the abnormal vehicle is identical to the abnormal vehicle notified by the report completion notice received from the other vehicle 2, the abnormality information about the abnormal vehicle will not be transmitted to the station 3. Thereby, in the communication between the vehicle 2 and the station 3, unnecessary communication (i.e., unnecessary information transmission) can be suppressed, and the frequency utilization efficiency can be improved.

(4b) In the present embodiment, since the vehicle 2 transmits the report completion notice received from one of the other vehicles 2 to the other surrounding vehicles 2, the report completion notice is sequentially transmitted from vehicle to vehicle and spreads. As a result, a transmission range of the report completion notice transmitted from the vehicle 2 that has detected the abnormal vehicle first can be expanded, thereby improving the frequency utilization efficiency.

(4c) In the present embodiment, the process of transmitting the report completion notice received from one of the other vehicles 2 to the other surrounding vehicles 2 will not be performed when a predetermined condition is satisfied, i.e., when a condition for limiting the number of transmission processes of the report completion notice is satisfied. Therefore, unnecessary information transmission process for transmitting the report completion notice to a vehicle 2 that has little chance of encounter with the abnormal vehicle, i.e., unnecessary long chains of information transmission, is reduced or prevented.

In the present embodiment, S202 corresponds to a process as a determiner, S204 corresponds to a process as a reporter, S205 corresponds to a process as a notifier, and S210 corresponds to a process as a notice broadcaster.

5. Other Embodiments

As mentioned above, although embodiment of the present disclosure has been described, it cannot be overemphasized that the present disclosure can take various forms, without being limited to the above-mentioned embodiment.

(5a) In the above-described embodiment, the vehicle 2 that has received the report completion notice from the other vehicle 2 transmits the report completion notice to the other surrounding vehicles 2 in principle (i.e., without having other conditions, in other words). However, for example, a process of transmitting the report completion notice to the other vehicle 2 may be performed, i.e., may be triggered, based on a condition that the vehicle 2 having received the report completion notice has actually detected the abnormal vehicle notified by the report completion notice.

(5b) In the above-described embodiment, the process of transmitting the report completion notice received from the other vehicle 2 to the other surrounding vehicles 2 is performed based on a condition that the abnormal vehicle notified by the report completion notice is determined as not being a registered vehicle. However, for example, regardless of whether the vehicle is a registered vehicle or not, all of the received report completion notices may be transmitted to the other surrounding vehicles 2.

(5c) In the above-described embodiment, as a predetermined condition for limiting the number of transmission processes of the report completion notice, the following (A) or (B) is set, i.e., (A) the distance between the vehicle 2 and the abnormal vehicle is equal to or greater than a predetermined distance, or (B) the elapsed time from the first transmission of the report completion notice is equal to or greater than a predetermined time. However, the predetermined condition is not limited to the above. For example, other, arbitrary condition may also be set, that is, a condition of only having a predetermined distance or more between the vehicle 2 and the abnormal vehicle or the like. Further, the number of transmission processes does not have to be limited.

(5d) In the above embodiment, the process in which the station 3 transmits the abnormality information to the server 4 will be restricted, i.e., will not be performed when the abnormal vehicle indicated by the abnormality information is a reported vehicle, for not transmitting the abnormality information to the server 4 about the same abnormal vehicle for many times. However, the transmission process does not have to be restricted.

(5e) The function possessed by one component in the above embodiment may be distributed among a plurality of components, or the function possessed by a plurality of components may be aggregated into one component. A part of the configuration in the above-described embodiment may be omitted. In addition, at least a part of the configuration of the above-described embodiment may be added to or replaced with the configuration of the other above-described embodiment.

(5f) In addition to the control device 27 described above, the present disclosure may include a system having the control device 27 as a component, a program for causing a computer to function as the control device 27, a medium storing such a program, and an abnormal vehicle notification method and so on, in various forms.

What is claimed is:

1. An abnormality notification device disposed in a first vehicle, comprising:
   an abnormality determiner configured to determine abnormality of contents of situation information representing a travel situation of a second vehicle after receiving the situation information from the second vehicle, wherein the contents are abnormal when the contents include information that prevents predicting whether a collision will occur between the first vehicle and the second vehicle and/or when the contents omit information necessary to predict whether the collision will occur;
   a registration determiner configured to, upon determination that the contents are abnormal, determine whether the second vehicle is registered as an abnormal vehicle;
   a station reporter configured to, upon determination that the second vehicle is not registered as the abnormal vehicle, to transmit an abnormality report to a station identifying the second vehicle as abnormal;
   a vehicle notifier configured to, upon the determination that the second vehicle is not registered as the abnormal vehicle, transmit a report completion notice to a third vehicle, indicating that the abnormality report identifying the second vehicle was transmitted to the station; and a registrar configured to, upon the determination that the second vehicle is not registered, register the second vehicle as the abnormal vehicle.

2. The abnormality notification device of claim 1, further comprising:
a report receiver configured to determine whether an additional report completion notice is received from an additional vehicle.

3. The abnormality notification device of claim 2, wherein the registration determiner is configured to, upon determining that the additional report completion notice is received from the additional vehicle, determine whether the additional vehicle is registered;
and further comprising:
a limits determiner configured to, upon determining that the additional vehicle is not registered, determine whether the additional report completion notice satisfied a preset condition; and wherein
the vehicle notifier is further configured to, upon determining that a preset condition is satisfied, send the report completion notice; and
the vehicle notifier is further configured to, upon determining that a preset condition is not satisfied, omit sending the report completion notice.

4. The abnormality notification device of claim 3, wherein the preset condition is based on at least one of a distance equal to or greater than a predetermined distance or an elapsed time equal to or greater than a predetermined time.

5. The abnormality notification device of claim 3, wherein the preset condition is based on a number of times of transmission.

6. A system comprising:
a processor;
a non-transitory computer-readable storage medium including instructions that, when executed, cause the following:
determine that situational information is received by a first vehicle from a second vehicle;
determine that the second vehicle is an abnormal vehicle when the situational information is abnormal information, wherein abnormal information includes first information that inhibits performing collision predictions and/or omits second information that facilitates performing the collision predictions;
determine that the second vehicle is not registered with the first vehicle in an abnormal vehicle registry; and
upon the determination that the second vehicle is not registered:
 (i) send an abnormal vehicle report to a station,
 (ii) send a report completion notice, and
 (iii) register the second vehicle in the abnormal vehicle registry.

* * * * *